US010666576B2

(12) United States Patent
Harned

(10) Patent No.: US 10,666,576 B2
(45) Date of Patent: *May 26, 2020

(54) PROCESSING SYSTEM RESPONSIVE TO ANALYSIS FILTER CRITERIA

(71) Applicant: Hartford Fire Insurance Company, Hartford, CT (US)

(72) Inventor: Thomas L. Harned, New Haven, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/056,846

(22) Filed: Aug. 7, 2018

(65) Prior Publication Data

US 2019/0014058 A1  Jan. 10, 2019

Related U.S. Application Data

(63) Continuation of application No. 15/161,582, filed on May 23, 2016, now Pat. No. 10,069,758.

(51) Int. Cl.
| | |
|---|---|
| *H04L 12/911* | (2013.01) |
| *H04L 12/24* | (2006.01) |
| *H04L 12/14* | (2006.01) |
| *G06F 15/16* | (2006.01) |
| *G06F 15/173* | (2006.01) |

(52) U.S. Cl.
CPC .................. *H04L 47/823* (2013.01)

(58) Field of Classification Search
USPC .......... 709/223–229, 235, 217, 205
See application file for complete search history.

(56) References Cited

U.S. PATENT DOCUMENTS

| | | | | |
|---|---|---|---|---|
| 8,713,179 | B2* | 4/2014 | Dawson | G06F 9/5072 709/226 |
| 9,961,383 | B2* | 5/2018 | Hasek | H04N 7/17336 |
| 10,003,507 | B2* | 6/2018 | Wood | H04L 12/146 |
| 10,069,758 | B2* | 9/2018 | Harned | H04L 47/823 |
| 2006/0069594 | A1* | 3/2006 | Yamasaki | G06F 9/5027 709/226 |
| 2010/0106534 | A1* | 4/2010 | Robinson | G06Q 10/02 705/5 |

(Continued)

*Primary Examiner* — Jude Jean Gilles
(74) *Attorney, Agent, or Firm* — Buckley, Maschoff & Talwalkar LLC

(57) ABSTRACT

According to some embodiments, a historical request data store may contain electronic records representing historical requests and, for each historical request, a set of analysis variables including a request description, resource allocation data, and at least one outcome indication. An automated outcome tracker system computer may catalogue a subset of the electronic records, based on the at least one outcome indication for each electronic record, as representing positive outcomes. An operator terminal may provide an interactive graphical user interface display and a back-end application computer server may receive from the operator terminal a set of analysis filter criteria. The back-end application computer server may then calculate and display impactability scores. According to some embodiments, the computer server may also calculate and display negative outcome risk scores.

20 Claims, 17 Drawing Sheets

(56) References Cited

U.S. PATENT DOCUMENTS

| | | | | |
|---|---|---|---|---|
| 2010/0131957 A1* | 5/2010 | Kami | ............... | G06F 9/5077 |
| | | | | 718/104 |
| 2011/0268056 A1* | 11/2011 | Soong | ............ | H04W 72/0406 |
| | | | | 370/329 |
| 2013/0332935 A1* | 12/2013 | Varma | ............... | G06F 9/5011 |
| | | | | 718/104 |
| 2014/0100922 A1* | 4/2014 | Aycock | ............ | G06Q 10/0639 |
| | | | | 705/7.38 |
| 2016/0302140 A1* | 10/2016 | Shaw | ................ | H04W 48/20 |
| 2017/0213159 A1* | 7/2017 | Hartmans | ............ | G06Q 10/02 |
| 2017/0257284 A1* | 9/2017 | Wood | ................ | H04L 12/146 |
| 2017/0339068 A1* | 11/2017 | Harned | ............ | H04L 41/147 |

* cited by examiner

CLINICAL ANALYTIC SCORING ENGINE

CASE
Clinical Analytics Scoring Engine - BETA — 610

Select Analysis Variables

Detailed Dx Desc, Job Class

Enter minimum claim volumes (annual)
0

Enter minimum MCM intervention volumes (annual)
0

Enter minimum RTWC/RCM intervention volumes (annual)
0

Select Columns to View total_claims, rtwc_impactability, ltd_risk — 650

Download

Show 10 entries                                          Search:

| primary_diagnosis_description | job_class | total_claims | rtwc_impactability — 630 | ltd_risk — 640 |
|---|---|---|---|---|
| VIRAL MENINGITIS NOS | 1 | 22 | 0.10 | 0.10 |
| VESTIBULAR NEURONITIS | 4 | 3 | 0.20 | 0.10 |
| VERTEBRL FX W/O CORD INJ | 2 | 38 | 0.10 | 1.23 |
| VERTEBRL FX W/O CORD INJ | 4 | 29 | 0.30 | 1.95 |
| VENTRAL HERNIA W OBSTRUC | 3 | 6 | 0.10 | 0.10 |
| VENTRAL HERNIA | 2 | 80 | 0.20 | 0.10 |
| VENTRAL HERNIA | 3 | 66 | 0.10 | 1.23 |
| VENTRAL HERNIA | 4 | 54 | 0.30 | 1.95 |
| VENOUS THROMBOSIS NOS | 5 | 1 | 0.10 | 1.23 |
| VENOUS THROMBOSIS NEC | 3 | 2 | 0.30 | 1.95 |

— 620 job_class, total_claims, rtwc_impactability, ltd_risk — 660

Showing 1 to 10 of 1,355 entries

Previous  1  2  3  4  5  ...  131  Next

CLINICAL ANALYTIC SCORING ENGINE

| std_dx_cat | job_class | mcm_impactability | rwc_impactability | ltd_risk |
|---|---|---|---|---|
| Musculoskeletal/Connective Disorders | 1 | 1.50 | 1.80 | 2.00 |
| Musculoskeletal/Connective Disorders | 2 | 0.50 | 1.23 | 1.00 |
| Musculoskeletal/Connective Disorders | 4 | 0.50 | 0.56 | 0.50 |
| Musculoskeletal/Connective Disorders | 3 | 1.20 | 0.78 | 1.20 |
| Musculoskeletal/Connective Disorders | 5 | 0.50 | 0.90 | 1.00 |

Showing 1 to 5 of 5 entries (filtered from 6 total entries)

FIG. 9

| CLAIM IDENTIFIER 1202 | INJURY DESCRIPTION 1204 | GENDER 1206 | AGE 1208 |
|---|---|---|---|
| C_1001 | LOWER LIMB FRACTURE | FEMALE | 45 |
| C_1002 | VENTRAL HERNIA | MALE | 25 |
| C_1003 | SPRAIN ROTATOR CUFF | FEMALE | 30 |

FIG. 12

PROCESSING SYSTEM RESPONSIVE TO ANALYSIS FILTER CRITERIA

CROSS-REFERENCE TO RELATED APPLICATIONS

The present application is a continuation of U.S. patent application Ser. No. 15/161,582 entitled "PROCESSING SYSTEM RESPONSIVE TO ANALYSIS FILTER CRITERIA" and filed May 23, 2016. The entire content of that application is incorporated herein by reference.

BACKGROUND

An enterprise system may be tasked with responding to requests that are received from various sources. For example, an enterprise system might need to respond to hundreds of thousands of such requests on a periodic basis. Note that the enterprise system might have a limited amount of resources that can be used to efficiently respond to those requests. As a result, the limited amount of resources may need to be allocated among the requests that are received by the enterprise system. In some cases, each request might be associated with various attribute characteristic values that might be used to help determine if resources could be efficiently allocated to that particular request. Manually reviewing each request, however, can be a time consuming and error probe task—especially when there are a substantial number of requests and/or attribute characteristic values associated with each request. Moreover, various attribute characteristic values could have hidden relationships associated with how effective an allocation of resources to that request will be, making manual review even more impractical.

It would be desirable to provide systems and methods to automatically improve the allocation of resources for an enterprise system in a way that provides faster, more effective recommendations and that allows for flexibility and effectiveness when determining and/or reviewing those recommendations.

SUMMARY OF THE INVENTION

According to some embodiments, systems, methods, apparatus, computer program code and means are provided to facilitate an allocation of resources for an enterprise system via an automated back-end application computer server. In some embodiments, a historical request data store contains electronic records representing a plurality of historical requests and, for each historical request, a set of analysis variables including: a request description, resource allocation data, and at least one outcome indication. An automated outcome tracker system computer is programmed to retrieve the electronic records from the historical request data store and catalogue a subset of the electronic records, based on the at least one outcome indication for each electronic record, as representing positive outcomes. An operator terminal may be adapted to provide an interactive graphical user interface display, and the automated back-end application computer server may be programmed to receive, from the operator terminal through a distributed communication network, a set of analysis filter criteria comprising indications of a plurality of analysis variables entered via the interactive graphical user interface display. The computer server may access the electronic records from the historical request data store and receive the information about the catalogued subset of electronic records from the automated outcome tracker system computer. Based on the analysis filter, resource allocation analysis variables, and catalogued subset of electronic records, the computer server may calculate impactability scores. Indications of the impactability scores may then be transmitted to be provided via the interactive graphical user interface display. According to some embodiments, a communication port is coupled to the back-end application computer server to facilitate an exchange of electronic messages associated with the interactive graphical user interface display via the distributed communication network. According to some embodiments, computer server may also calculate (based on the analysis filter, resource allocation analysis variables, and outcome indications) and display negative outcome risk scores.

Some embodiments comprise: means for retrieving, by an automated outcome tracker system computer from a historical request data store, electronic records representing a plurality of historical requests and, for each historical request, a set of analysis variables including: a request description, resource allocation data, and at least one outcome indication; means for cataloguing, by the automated outcome tracker system computer, a subset of the electronic records, based on the at least one outcome indication for each electronic record, as representing positive outcomes; means for outputting, from the automated outcome tracker system computer, information about the catalogued subset of electronic records; means for receiving, by the automated back-end application computer server from a remote operator terminal through a distributed communication network, a set of analysis filter criteria comprising indications of a plurality of analysis variables entered via the interactive graphical user interface display; means for accessing, by the back-end application computer server, the electronic records from the historical request data store and receiving the information about the catalogued subset of electronic records from the automated outcome tracker system computer; based on the analysis filter, resource allocation analysis variables, and catalogued subset of electronic records, means for calculating impactability scores; and means for transmitting, from the back-end application computer server, indications of the impactability scores to be provided via the interactive graphical user interface display.

In some embodiments, a communication device associated with a back-end application computer server exchanges information with remote devices. The information may be exchanged, for example, via public and/or proprietary communication networks.

A technical effect of some embodiments of the invention is an improved and/or computerized way to automatically improve the allocation of resources for an enterprise system in a way that provides faster, more effective recommendations and that allows for flexibility and effectiveness when determining and/or reviewing those recommendations. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 6 through 10 illustrate interactive GUI displays for a clinical analytic scoring engine according to some embodiments.

FIG. 12 is a portion of a tabular claim resource allocation database in accordance with some embodiments.

DETAILED DESCRIPTION

The present invention provides significant technical improvements to facilitate electronic messaging, predictive modeling, and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of resource allocation by providing benefits in data accuracy, data availability, and data integrity, and such advances are not merely a long-standing commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be processed, forecast, and/or predicted via a back-end application server and results may then be analyzed efficiently to evaluate the accuracy of various results and recommendations, thus improving the overall performance of an enterprise system, including message storage requirements and/or bandwidth considerations (e.g., by reducing the number of messages that need to be transmitted via a network). Moreover, embodiments associated with predictive models might further improve performance values, predictions of performance values, resource allocation decisions, etc.

An enterprise system may be tasked with responding to requests that are received from various sources. For example, an enterprise system might need to respond to hundreds of thousands of such requests on a periodic basis. Note that the enterprise system might have a limited amount of resources that can be used to efficiently respond to those requests. As a result, the limited amount of resources may need to be allocated among the requests that are received by the enterprise system. In some cases, each request might be associated with various attribute characteristic values that might be used to help determine if resources could be efficiently allocated to that particular request. Manually reviewing each request, however, can be a time consuming and error probe task—especially when there are a substantial number of requests and/or attribute characteristic values associated with each request. Moreover, various attribute characteristic values could have hidden relationships associated with how effective an allocation of resources to that request will be, making manual review even more impractical.

Figure 1:
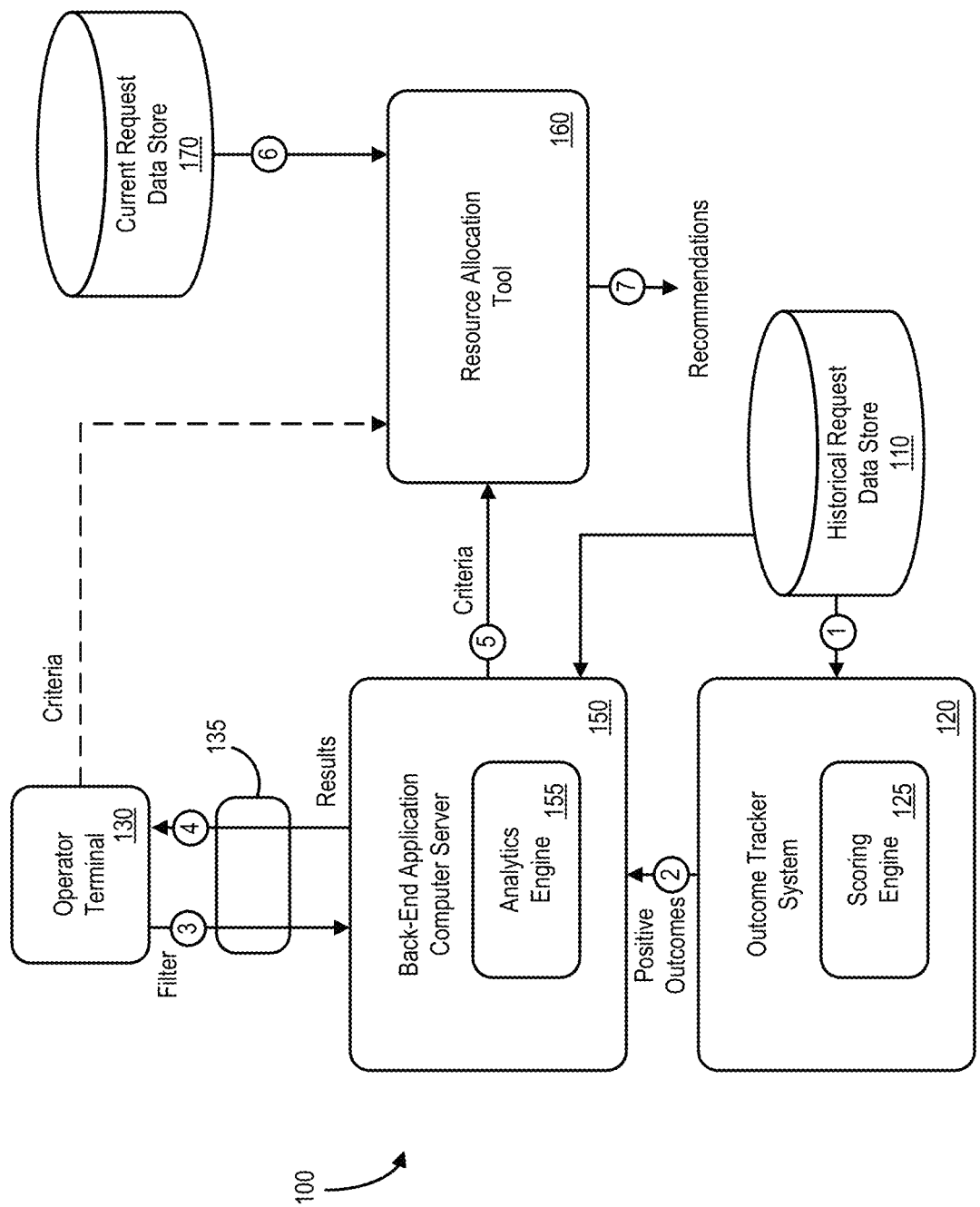
FIG. 1 is a high-level block diagram of a system according to some embodiments.

It would be desirable to provide systems and methods to facilitate an allocation of resources in a way that provides faster, more effective recommendations and that allows for flexibility and effectiveness when determining and/or reviewing those recommendations. FIG. 1 is a high-level block diagram of an enterprise system 100 according to some embodiments of the present invention. In particular, the system 100 includes a back-end application computer server 150 and an outcome tracker system 120 that may access information in a historical request data store 110 (e.g., storing a set of electronic records representing requests associated with risk associations, each record including one or more communication addresses, attribute variables, etc.). The back-end application computer server 150 may also exchange information with a remote operator terminal 130 (e.g., via a firewall 135). According to some embodiments, a scoring engine 125 in the outcome tracker system 120 may catalogue records in the historic request data store 110 as having "successful" or "unsuccessful" outcomes. Moreover, an analytics engine 155 of the back-end application computer server 150 may facilitate data processing, predictions, and/or the display of results via one or more remote operator terminals 130. A resource allocation tool 160 might receive criteria from the back-end application computer server 150 (or from the operator terminal 130) and use that criteria to process records in a current request data store 170 and generate recommendations. Further note that the outcome tracker system 120, the back-end application computer server 150, and/or the resource allocation tool 160 might be associated with a third party, such as a vendor that performs a service for the enterprise system 100.

The outcome tracker system 120, the back-end application computer server 150, resource allocation tool 160, operator terminal 130 might be, for example, associated with a Personal Computer ("PC"), laptop computer, smartphone, an enterprise server, a server farm, and/or a database or similar storage devices. According to some embodiments, an "automated" outcome tracker system 120, back-end application computer server 150, and/or resource allocation tool 160 may facilitate data processing associated with an allocation of resources based on electronic records in the historical request data store 110 and current request data store 170. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the historical request data store 110. The historical request data store 110 might, for example, store electronic records representing a plurality of requests associated with risk associations, each electronic record having a set of attribute values. The historical request data store 110 may also contain information about past and current interactions with parties, including those associated with remote communication devices. The historical request data store 110 may be locally stored or reside remote from the back-end application computer server 150 and/or the outcome tracker system 120. As will be described further below, the historical request data store 110 may be used by the back-end application computer server 150 to facilitate an allocation of resources. Although a single back-end application computer server 150 is shown in FIG. 1, any number of such devices (and other elements) may be included. Moreover, various devices described herein might be combined according to embodiments of the present invention. For example, in some embodiments, the back-end application computer server 150, the outcome tracker system 120, and/or the resource allocation tool 160 might be co-located and/or may comprise a single apparatus.

According to some embodiments, the enterprise system 100 may automatically facilitate an allocation of resources via the automated back-end application computer server 150. For example, at (1) the outcome tracker system 120 may access information in the historical request data store 110 and use the scoring engine 125 to catalogue records as representing positive outcomes. The information about positive outcomes may be transmitted to the back-end application computer server 150 at (2). At (3), a user at an operator terminal 130 may provide a set of filter criteria to the back-end application computer server 150. The analytics engine 155 may then use the received information to calculate results to be provided to the operator terminal 130 at (4). Promising criteria may then be provided to the resource allocation tool 160 (either from the operator terminal 130 or the back-end application computer server 150) at (5). The resource allocation tool 160 may then access information in the current request data store 170 at (6) and use the appropriate criteria to generate appropriate recommendations at (7).

Figure 2:
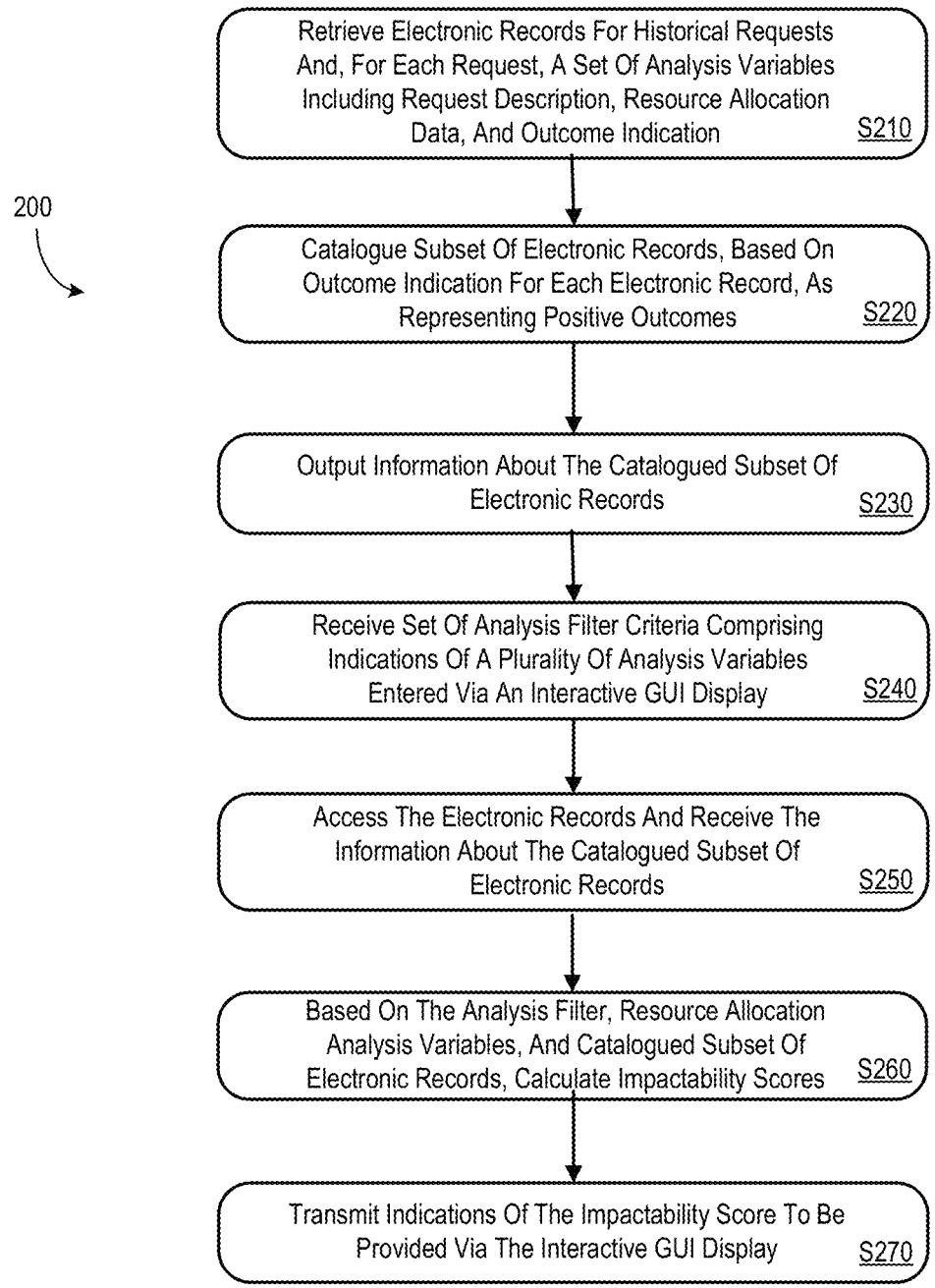
FIG. 2 illustrates a method according to some embodiments of the present invention.

Note that the system 100 of FIG. 1 is provided only as an example, and embodiments may be associated with additional elements or components. According to some embodiments, the elements of the enterprise system 100 automatically facilitate an allocation of resources using a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may retrieve, from a historical request data store, electronic records representing a plurality of historical requests and, for each historical request, a set of analysis variables including a request description, resource allocation data, and at least one outcome indication. At S220, an automated outcome tracker system computer may retrieve the electronic records from the historical request data store and catalogue a subset of the electronic records, based on the at least one outcome indication for each electronic record, as representing positive outcomes. At S230, the outcome tracker system may output information about the catalogued subset of electronic records.

According to some embodiments, an operator terminal may be adapted to provide an interactive Graphical User Interface ("GUI") display. At S240, an automated back-end application computer server, remote from the operator terminal and coupled to the automated outcome tracker system computer and the operator terminal, may receive, from the operator terminal through a distributed communication network, a set of analysis filter criteria comprising indications of a plurality of analysis variables entered via the interactive GUI display.

At S250, the back-end application computer server may access the electronic records from the historical request data store and receive the information about the catalogued subset of electronic records from the automated outcome tracker system computer. Based on the analysis filter, resource allocation analysis variables, and catalogued subset of electronic records, the back-end application computer server may calculate impactability scores at S260. For example, records with low impactability scores may be unlikely to benefit from an allocation of resources (e.g., there is little hope the resources will be effective).

At S270, the back-end application computer server may transmit indications of the impactability scores to be provided via the interactive GUI display. According to some embodiments, a communication port coupled to the back-end application computer server may facilitate an exchange of electronic messages associated with the interactive GUI display via the distributed communication network. In some embodiments, the computer server may also calculate (based on the analysis filter, resource allocation analysis variables, and outcome indications) negative outcome risk scores. Note that records with relatively high negative outcome risk scores might especially benefit from an allocation of resources (e.g., because the eventual negative outcome might be avoided). According to some embodiments, a risk allocation tool computer may receive the set of analysis filter criteria as meeting a pre-determined performance threshold. The risk allocation tool computer may then receive electronic records representing a plurality of current requests and, for each historical request, a set of analysis variables, and automatically output a resource allocation recommendation for the enterprise system in connection with each current request based on the set of analysis filter criteria. In this way, an operator might explore different subset of records and how they each might potentially benefit from an allocation of resources.

Figure 3:
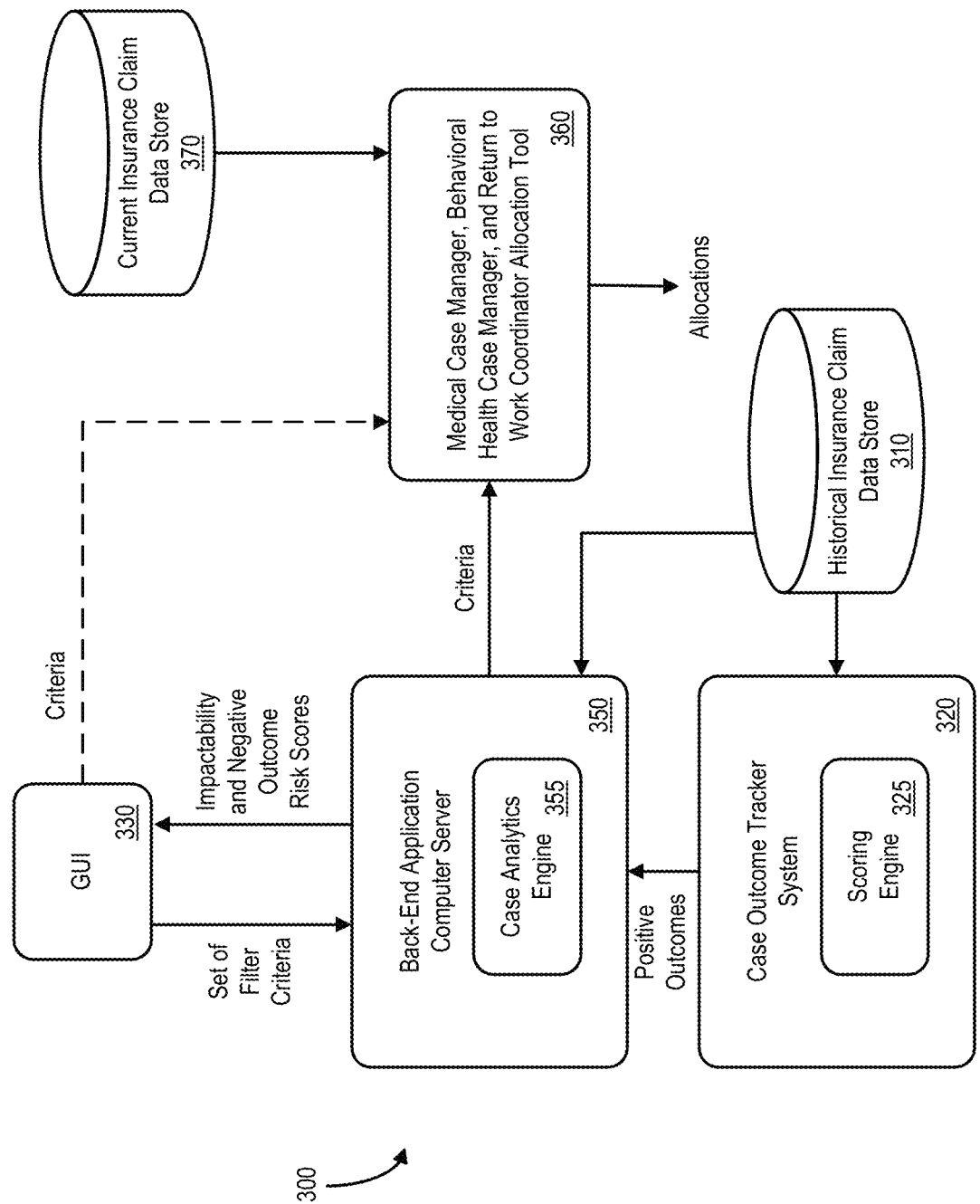
FIG. 3 is a high-level block diagram of an insurance enterprise system according to some embodiments.

Note that the embodiments described with respect to FIGS. 1 and 2 may be applicable to many different types of enterprise systems. For example, FIG. 3 is a high-level block diagram of a Short Term Disability ("STD") group benefits insurance enterprise system 300 according to some embodiments. As before, the insurance system 300 includes a back-end application computer server 350 and a case outcome tracker system 320 that may access information in a historical insurance data store 310 (e.g., storing a set of electronic records representing STD insurance claims associated with group benefits insurance policies, each record including one or more communication addresses, attribute variables, etc.). The back-end application computer server 350 may also exchange information with a remote interactive GUI display 330. According to some embodiments, a scoring engine 325 in the case outcome tracker system 320 may catalogue records in the historic insurance claim data store 310 as having "successful" or "unsuccessful" outcomes. As used herein, the phrase "successful outcome" might refer to, for example, a clinical resolution or success rate identified by process owners of each clinical process as being a subset of outcomes for each clinical resource type to be denoted as a success from a clinical standpoint.

Moreover, a case analytics engine 355 of the back-end application computer server 350 may facilitate data processing, predictions, and/or the display of results via one or more remote interactive GUI displays 330. A medical case manager, behavioral health case manager, and return to work coordinator allocation tool 360 might receive criteria from the back-end application computer server 350 (or from the interactive GUI display 330) and use that criteria to process records in a current insurance claim data store 370 and generate recommendations. Further note that the case outcome tracker system 320, the back-end application computer server 350, and/or the medical case manager, behavioral health case manager, and return to work coordinator allocation tool 360 might be associated with a third party, such as a vendor that performs a service for the enterprise system 300.

According to some embodiments, the insurance enterprise system 300 is associated with a group benefits insurance system and the historical requests represent STD insurance claims. In this case, the request description in the historical insurance claim data store 310 (and the current insurance claim data store 370) might be associated with, for example, a diagnosis category, a diagnosis code, and/or a surgical procedure code. Moreover, the at least one outcome indication stored for each STD claim might be associated with a disability duration. Other information in the set of analysis variables might include: an age at date of disability (e.g., a numerical value in years, a flag indicating the claimant is over 40 years old, etc.), a job class (e.g., a numerical rating, a "light," "medium," or "heavy" category, etc.), a claim volume, a claim complexity segment, a detailed description of a primary disabling diagnosis, a medical diagnosis code, an indication of whether a diagnosis is highly subjective, an indication of multiple diagnoses, a surgery code, gender, an indication of a musculoskeletal diagnosis, an indication of a diabetes diagnosis, a substance abuse diagnosis, a hypertension diagnosis, a lower limb fracture diagnosis, an inability to contact claimant, an indication claimant has employment issues (e.g., was the claimant fired, was the claimant subject to disciplinary actions, etc.), a prior history of claims, a hiring date, and/or a retirement date.

According to some embodiments, the case analytics engine 355 calculates an "impactability score" based on the set of filter criteria received from the interactive GUI display 330. As used herein, the phrase "impactability score" might refer to, for example, a relative measure of clinical success for a given resource type on a given set of claims. This might be calculated, for example, by dividing a clinical resolution rate for a given set of claims by an overall clinical resolution rate across all claims. The result might be, for example, a number that is normalized to 1. According to some embodiments, impactability scores may be associated with medical case managers, behavioral health case managers, and/or return to work coordinators.

The case analytics engine 355 may also calculate a "negative outcome risk score" based on the set of filter criteria received from the interactive GUI display 330. The "negative outcome risk score" might indicate a relative likelihood of a claim (in a given group) eventually transitioning to a Long Term Disability ("LTD") insurance claim. This may be calculated, for example, by dividing the percentage of claims in a given group that transition to LTD by the percentage of all STD claims that transition to LTD. Another value that might be calculated by the case analytics engine 355 is "volatility" which may be associated with a relative measure of predictability (or lack thereof) in a given group of claims. This might be calculated by dividing a standard deviation of benefit duration days (for a given group) by the standard deviation of the benefit duration days on all STD claims. Still another value that might be calculated by the case analytics engine 355 is "duration risk" which may be associated with a measure of severity that indicates a relative risk of a claim (in a given group) exceeding an expected duration by 14 days or more, with an expected duration established by actuarial. This might be calculated, for example, by dividing a probability of a claim (in a given group) exceeding duration by 14 days or more by the percentage of all STD claims that exceed duration by 14 days or more. Still other examples of values that might be calculated by the automated back-end application computer server 350 include: a median claim duration, a mean claim duration, a total number of interventions, interventions as a percent of claim volume, successes as a percentage of interventions, a mean number of paid benefit days, a median number of paid benefit days, and a standard deviation of claim duration days.

According to some embodiments, the automated back-end application computer server 350 is further programmed to receive, from the interactive GUI display 330 through a distributed communication network (e.g., the Internet), an adjusted set of analysis filter criteria. The computer server 350 may then re-calculate the impactability and negative outcome risk scores based on the adjusted set of analysis filter criteria and transmit indications of the re-calculated scores to be provided via the interactive GUI display 330.

Figure 4:
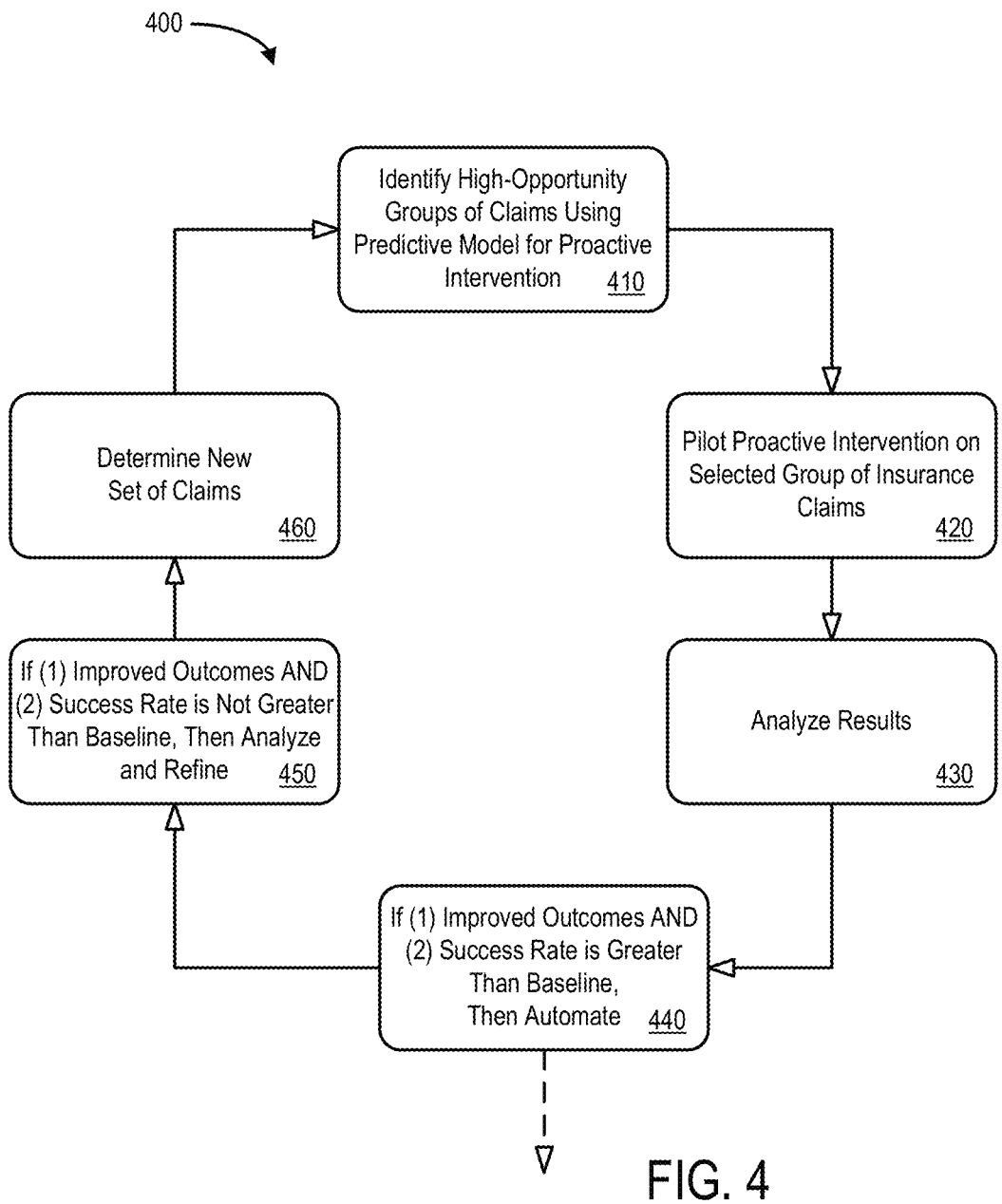
FIG. 4 is a flow diagram associated with processes and criteria associated with predictive analytics accordance with some embodiments of the present invention.

In this way, the insurance enterprise system 300 may be used to explore and analyze information in the historical insurance claim data store 310 in a predictive manner. For example, FIG. 4 is a flow diagram 400 associated with processes and criteria associated with predictive analytics accordance with some embodiments of the present invention. At 410, high opportunity groups of claims may be identified using a predictive model for proactive intervention. Selection criteria might include, for example, a likelihood of exceeding expected duration (associated with risk), a likelihood of transitioning to a LTD claim, a current clinical success rate (associated with impactability), and clinical expertise (whether or not the model makes sense from a clinical standpoint). At 420, the proactive intervention might be tried in a pilot program on a selected group of STD insurance claims. At 430, the results of that pilot program may be analyzed. If it is determined at 440 both that (1) improved outcomes were achieved and (2) the success rate was greater than a baseline level of success, the pilot program might be automated (e.g., and implemented full-scale for all future STD insurance claims). In some cases, the flow diagram might be exited at this point (as illustrated by the dashed arrow in FIG. 4). If it is determined at 450 both that (1) improved outcomes were achieved and (2) the success rate was not greater than a baseline level of success, the pilot program might be analyzed and refined (e.g., in an attempt to achieve improved results). A new set of claims might be determined at 460 and the entire process may be repeated at 410.

Figure 5:
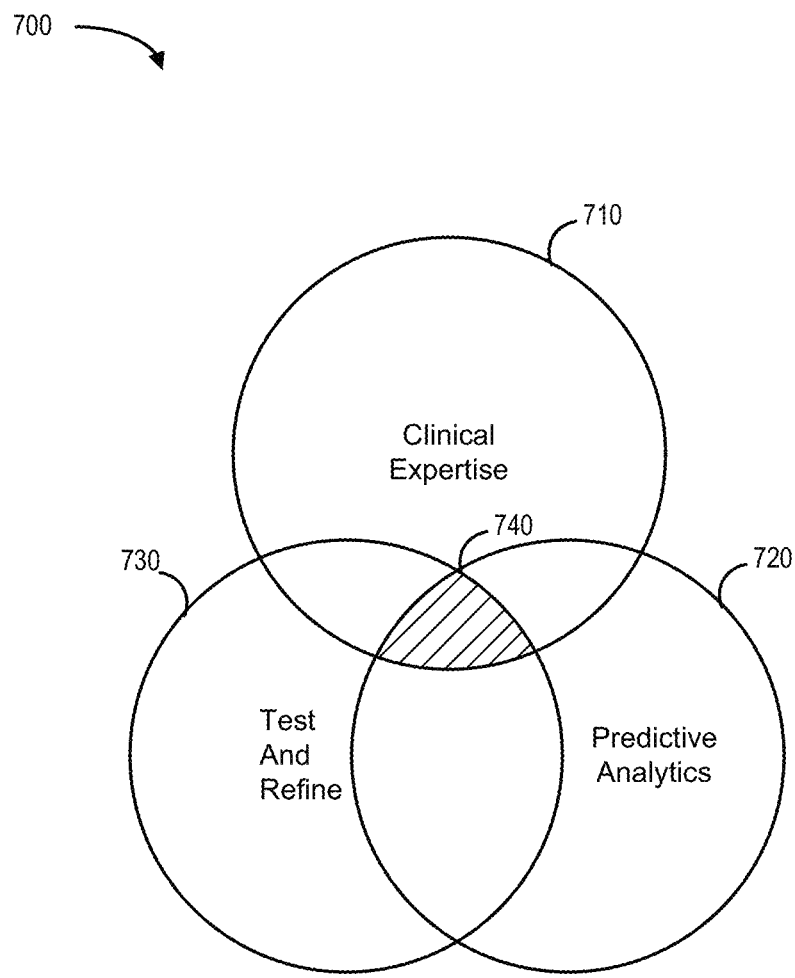
FIG. 5 illustrates an approach to predictive analytics according to some embodiments.

FIG. 5 illustrates an approach 500 to predictive analytics according to some embodiments. In particular, the approach 500 leverages clinical expertise 510 alongside predictive analytics 520 to provide a culture of continuous improvement (e.g., via a test and refine process 530). As a result, significant and sustained improvements may be achieved via proactive clinical intervention on high-risk, high-opportunity STD insurance claims at the intersection 540 of the clinical expertise 510, predictive analytics 520, and test and refine process 530.

To help identify such claims, FIG. 6 illustrates an interactive GUI display 600 including visually perceptible elements for a clinical analytic scoring engine according to some embodiments. The display 600 includes a "select analysis variables" 610 area when an operator can define input variables to test and analyze. Such inputs might include, for example, a major STD disabling diagnosis category, a detailed description of a primary disabling diagnosis, an International Statistical Classification ("ICD") medical diagnosis code (e.g., an alpha-numeric code that classifies diseases and a wide variety of signs, symptoms, abnormal findings, complaints, social circumstances and external causes of injury or disease), a binary variable indicating whether or not a diagnosis is "highly subjective," whether a claimant have multiple diagnoses, a surgery code, a job class, a customer account, the claimant's gender, a claim segment level, claimant age information (e.g., is the claimant older than 61?), a secondary diagnosis, a tertiary diagnosis, an indication of breast cancer, an indication of musculoskeletal diagnosis, an indication of diabetes, an indication of substance abuse, an indication of depression, an indication of hypertension, an indication of lower limb fracture, an indication the insurance enterprise is unable to contact the claimant, an indication that the claimant had a disciplinary issue at work, an indication the claimant a disgruntle employee, an indication that there are inconsistent details in the claim file, an indication that the claimant has difficult circumstances in life outside of work, an indication that the claimant had a prior history of claims, an indication that the claimant was recently hired, an indication that the claimant plans to retire soon, and/or an indication that the claimant uncooperative.

The display 600 also includes a "select columns to view" 620 area when an operator can define output variables. Such outputs might include, for example, normalized impactability scores 630 and LTD risk scores 640. Other examples of output variables might include, for example, a total number of annual claims, a total number of interventions by medical case managers, a number of interventions as a percent of claim volume, a number of successful interventions as defined by the insurance enterprise, a number of successes as a percentage of interventions, a total number of interventions by return to work coordinators or rehabilitation case managers, a total number of interventions by behavioral health case managers, mean claim durations days, median claim duration days, mean number of paid benefit days, median number of paid benefit days, standard deviation of the claims duration days, percentage of claims that exceed their expected duration by 14 days or more, volume of claims that transition into LTD, percentage of claims that transition into LTD, relative variability in claim durations for a specified group of claims, compared to the overall population of claims, relative risk of a claim in a specified group exceeding the expected duration by 14 days or more, and/or relative risk of a claim in a specified group transitioning into LTD. The display 600 may further include a download icon 650 (e.g., selectable to save an electronic file of results, such as a comma separated values file) and/or a search entry 660 area (e.g., where an operator can enter one or more search terms).

Figure 7:
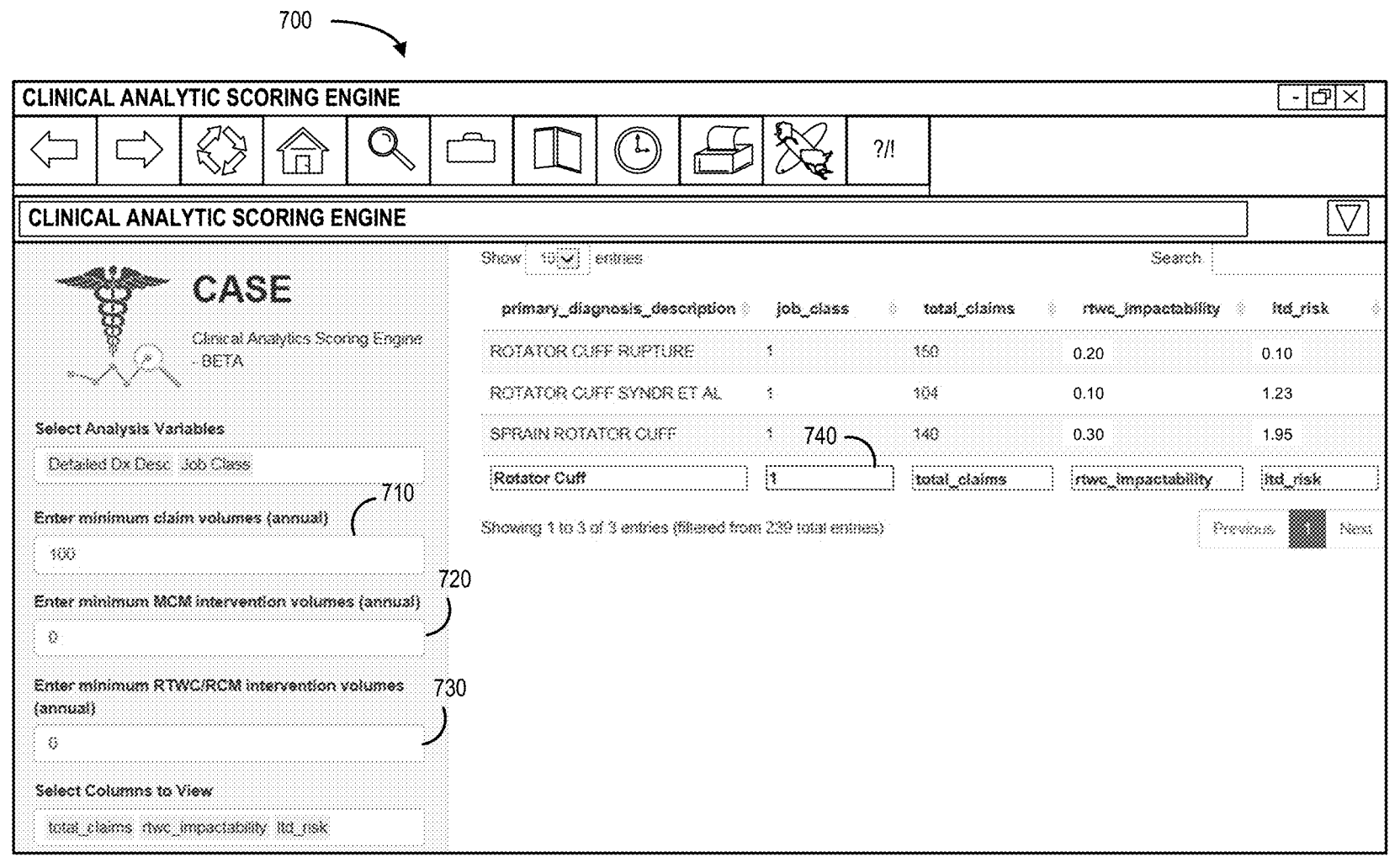
Figure 8:
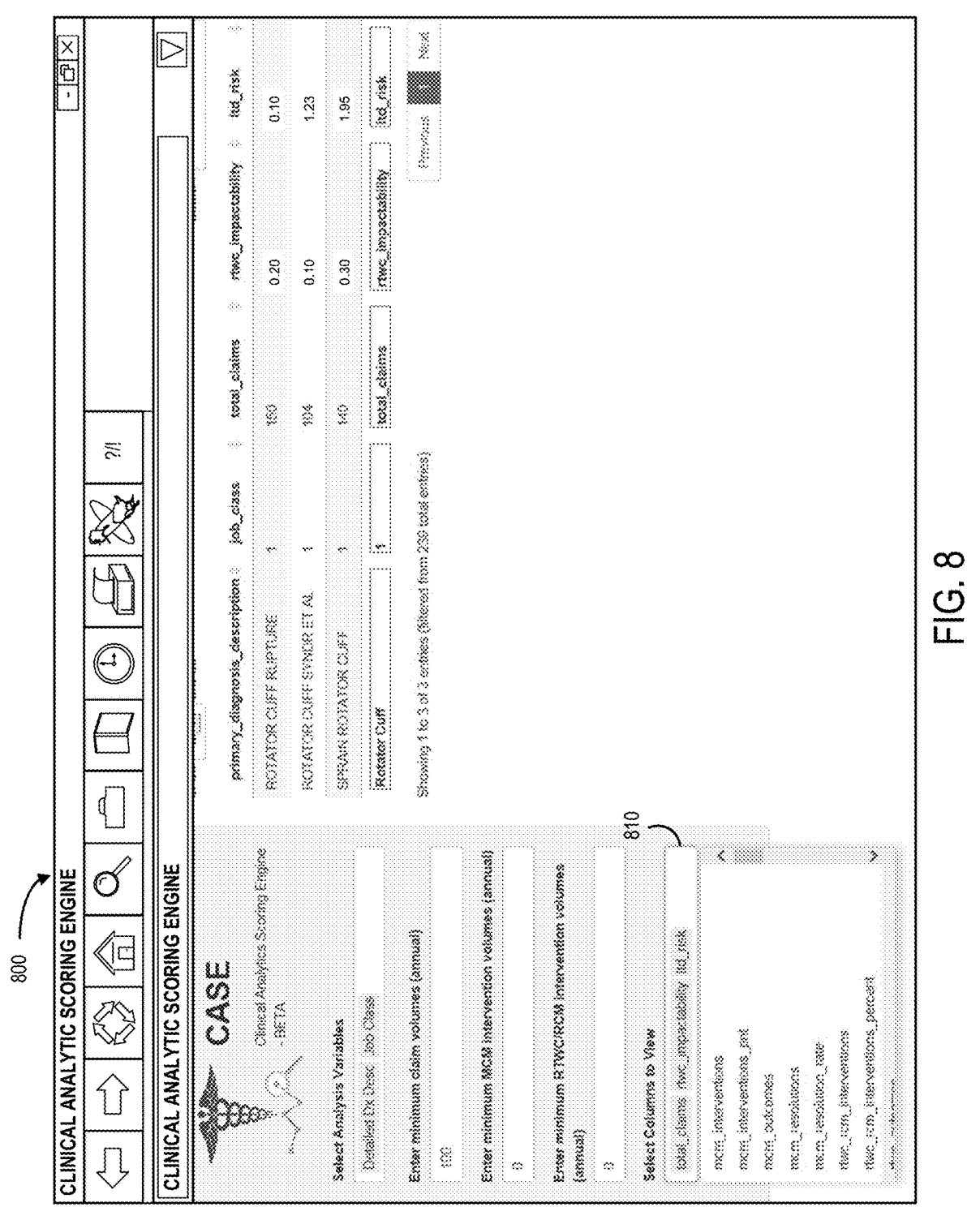

As illustrated in FIG. 7, a display 700 may further include an "enter minimum claim volumes (annual)" 710 area where an operator can define a threshold number of claims. For example, an operator might only be interested in results associated with at least a particular number of claims. Similar, the display might include a minimum medical case manager number of claims 720 area and/or a minimum return to work coordinator number of claims 730. According to some embodiments, an operator might also enter values 740 to search and/or re-order results to be analyzed. As illustrated in FIG. 8, a display 800 may utilize a drop-down menu to "select columns to view" 810. In this way, an operator might indicate that he or she is interested in particular types of interventions, resolution rates, etc. For example, the display 900 in FIG. 9 illustrates an operator who is particularly interested in a "musculoskeletal" 910 diagnosis category. Moreover, the results indicate that the normalized return to work coordinator impactability score 920 is "1.80" (which might indicate that this type of injury might especially benefit from this type of resource allocation).

By way of example, an insurance enterprise might use a clinical analytic scoring engine tool to generate groups of STD group benefit claims for proactive clinical intervention using as follows. A group of clinicians might brainstorm hypotheses around which groups and types of claims would benefit from increased rates of clinical intervention. The group may validate the hypotheses in real time, identifying selected groups of claims where the impactability scores for at least one type of clinician is over 1.0 and the duration or LTD risk score is also over 1.0. For example, the clinicians might identify lower limb fractures as a potential claim group that could benefit from increased involvement from return to work coordinators. The clinicians might identify the following set of criteria using the tool:

Age at Date of Disability>=35
Job Class=1 OR 2
STD Diagnosis Category="Fracture/Injury Lower Limb"
Surgery="Yes"

Figure 10:
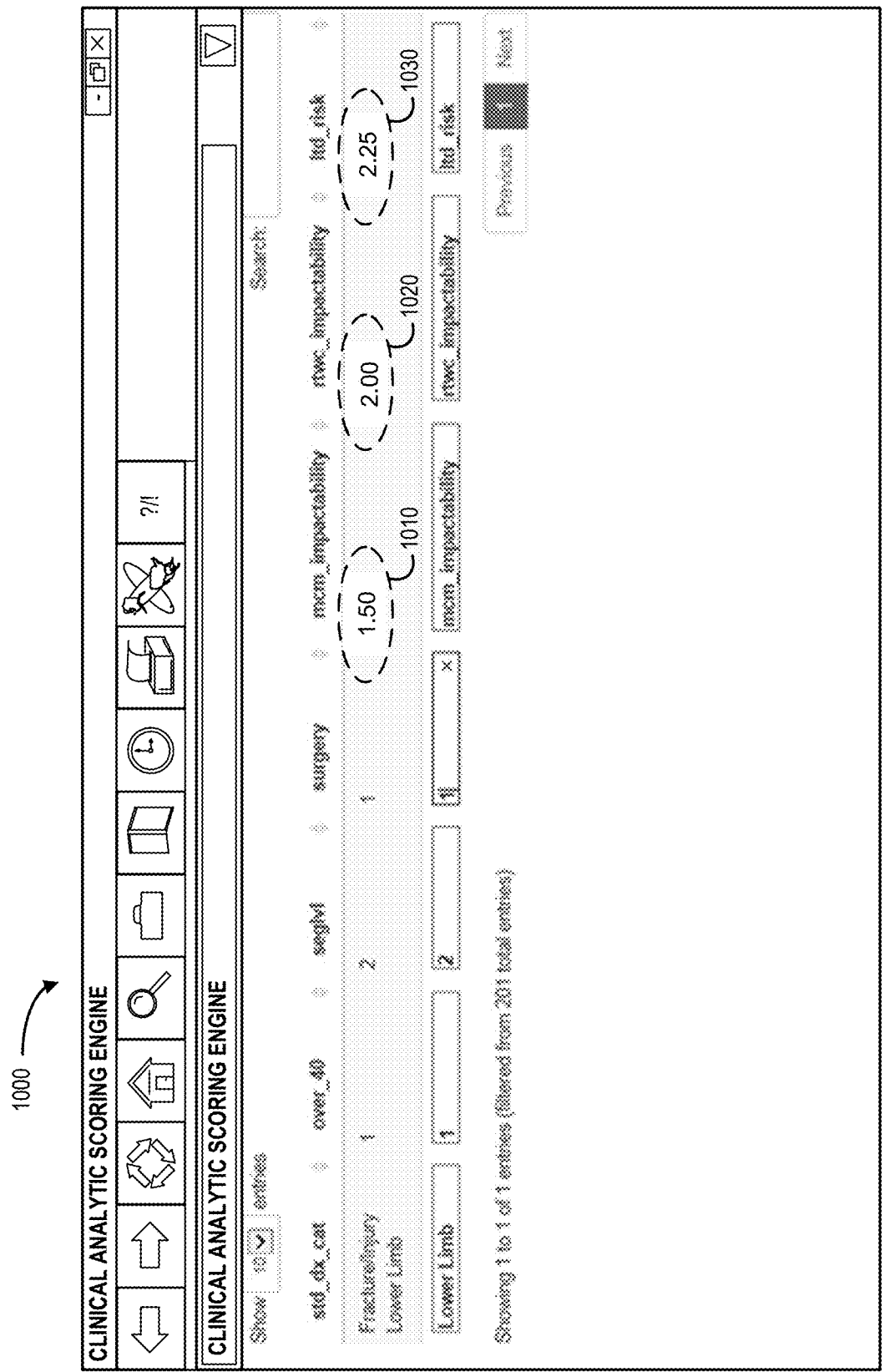

As shown by the display 1000 in FIG. 10, this group has a high likelihood of going into LTD (LTD risk 1030 of "2.25"), which can make it more difficult for the claimant to eventually return to employment. Additionally, the medical case mangers impactability 1010 ("1.50") and return to work coordinators impactability 1020 ("2.00") are relatively high, indicating they have historically been able to positively impact outcomes on these types of claims. This group of claims, along with other groups identified using this process, may then be automatically pushed to the appropriate clinical resource in a pilot initiative. The results are tracked and analyzed. If the successes rate (i.e., resolution rate) is higher than a baseline success rate for a given type of clinical resource (e.g., 20%) the identified group of claims is put into an automated referral process as a go-forward strategy.

Figure 11:
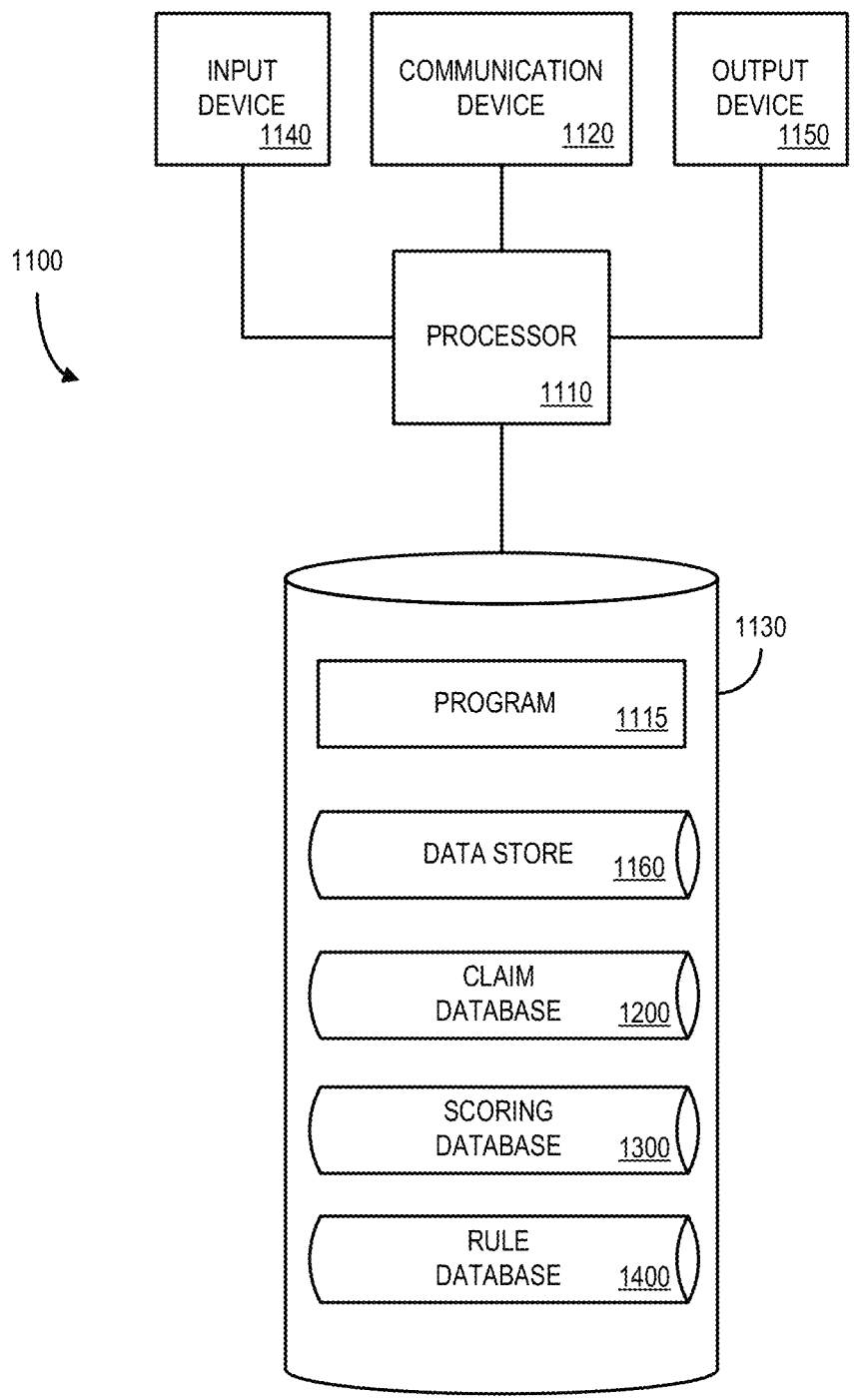
FIG. 11 is a block diagram of an apparatus in accordance with some embodiments of the present invention.

The embodiments described herein may be implemented using any number of different hardware configurations. For example, FIG. 11 illustrates a back-end application computer server 1100 that may be, for example, associated with the systems 100, 300 of FIGS. 1 and 3. The back-end application computer server 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote operator terminals and or communication devices (e.g., PCs and smartphones). Note that communications exchanged via the communication device 1120 may utilize security features, such as those between a public internet user and an internal network of the insurance enterprise. The security features might be associated with, for example, web servers, firewalls, and/or PCI infrastructure. The back-end application computer server 1100 further includes an input device 1140 (e.g., a mouse and/or keyboard to enter information about past insurance claims, predictive models, etc.) and an output device 1150 (e.g., to output reports regarding system administration and/or predictive analytic results).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a scoring tool or application for controlling the processor 1110. The processor 1110 performs instructions of the program 1115, and thereby operates in accordance with any of the embodiments described herein. For example, the processor 1110 may access a historical request data store that contains electronic records representing historical requests and, for each historical request, a set of analysis variables including a request description, resource allocation data, and at least one outcome indication. The processor 1110 may catalogue a subset of the electronic records, based on the at least one outcome indication for each electronic record, as representing positive outcomes. An operator terminal may provide an interactive GUI display and the processor 1110 receive from the operator terminal a set of analysis filter criteria. The processor 1110 may then calculate impactability and negative outcome risk scores.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the back-end application computer server 1100 from another device; or (ii) a software application or module within the back-end application computer server 1100 from another software application, module, or any other source.

In some embodiments (such as shown in FIG. 11), the storage device 1130 further stores a claim database 1200, a scoring database 1300, and a rule database 1400. Examples of databases that might be used in connection with the back-end application computer server 1100 will now be described in detail with respect to FIGS. 12 through 14. Note that the databases described herein are only examples, and additional and/or different information may be stored therein. Moreover, various databases might be split or combined in accordance with any of the embodiments described herein. For example, claim database 1200 and/or scoring database 1300 might be combined and/or linked to each other within the program 1115.

Referring to FIG. 12, a table is shown that represents the claim database 1200 that may be stored at the back-end application computer server 1100 according to some embodiments. The table may include, for example, entries associated with historical or current STD insurance claims. The table may also define fields 1202, 1204, 1206, 1208 for each of the entries. The fields 1202, 1204, 1206, 1208 may, according to some embodiments, specify: a claim identifier 1202, an injury description 1204, a gender 1206, and an age 1208. The claim database 1200 may be created and updated, for example, based on information electrically received from a historical or current claim data store.

The claim identifier 1202 may be, for example, a unique alphanumeric code identifying a STD insurance claim (e.g., either a historical insurance claim or a current insurance claim). The injury description 1204, gender 1206, and age 1208 may describe the particular details of the STD insurance claim. This information may be used, for example, to create a set of search criteria variables when analyzing subgroups of claims.

Figure 13:
FIG. 13 is a portion of a tabular scoring database according to some embodiments.

Referring to FIG. 13, a table is shown that represents the scoring database 1300 that may be stored at the back-end application computer server 1100 according to some embodiments. The table may include, for example, entries associated with claims and/or subsets of STD insurance claims. The table may also define fields 1302, 1304, 1306, 1308 for each of the entries. The fields 1302, 1304, 1306, 1308 may, according to some embodiments, specify: a claim or claim group identifier 1302, a successful outcome indication 1304, an impactability score 1306, and a LTD risk score 1308. The scoring database 1300 may be created and updated, for example, based on information electrically received from historical and/or current STD insurance claims.

The claim or claim group identifier 1302 may be, for example, a unique alphanumeric code identifying a particular STD insurance claim or group of STD insurance claims (e.g., as defined by a set of search criteria). In the case of historical claims, the successful outcome indication 1304 might be determined, for example, by an outcome tracker system. The impactability score 1306 might be associated with how likely it is that a particular resource will help improve claim resolution. The LTD risk score 1308 indicates how likely it is that a STD insurance claim will transition to a LTD claim (and, as a result, might be more likely to benefit from allocated resources).

Figure 14:
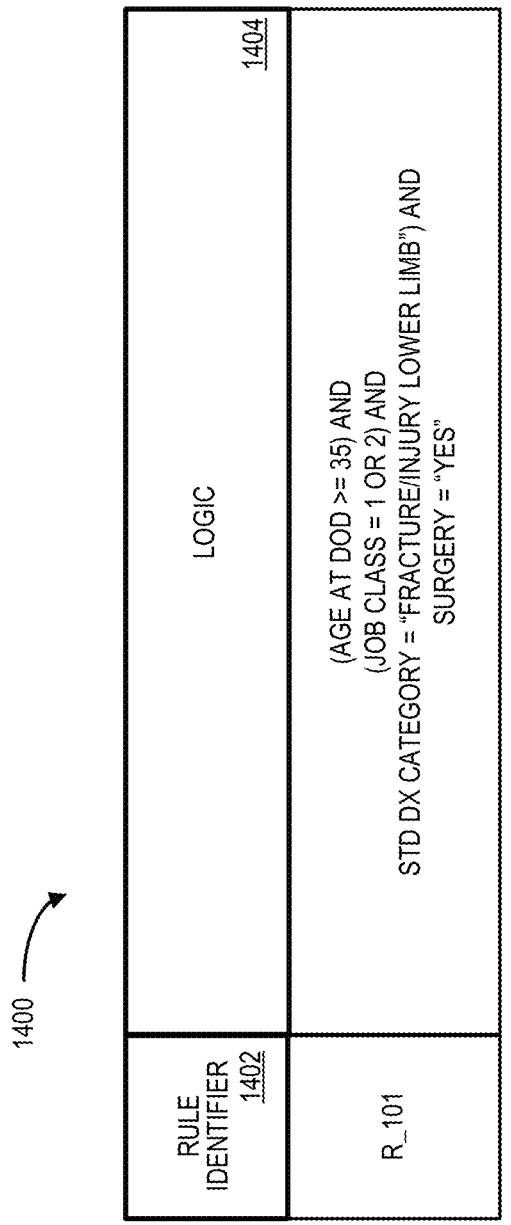
FIG. 14 is a portion of a tabular rule database in accordance with some embodiments.

Referring to FIG. 14, a table is shown that represents the rule database 1400 that may be stored at the back-end application computer server 1100 according to some embodiments. The table may include, for example, entries associated with rules are will be used to allocate resources to STD insurance claims. The table may also define fields 1402, 1404 for each of the entries. The fields 1402, 1404 may, according to some embodiments, specify: a rule identifier 1402 and logic 1404. The rule database 1400 may be created and updated, for example, based on information electrically received from an operator terminal or predictive model (e.g., that automatically identifies potential successful subgroups of claims).

The rule identifier 1402 may be, for example, a unique alphanumeric code identifying business logic or search criteria that will be used to allocate resources (e.g., as either part of a pilot program or as an ongoing strategy). The logic 1404 might represent, for example, a set of search criteria that has been identified as being helpful in connection with the allocation of resources to STD insurance claims. The logic 1404 might have been identified, for example, by an operator or a predictive model.

Figure 15:
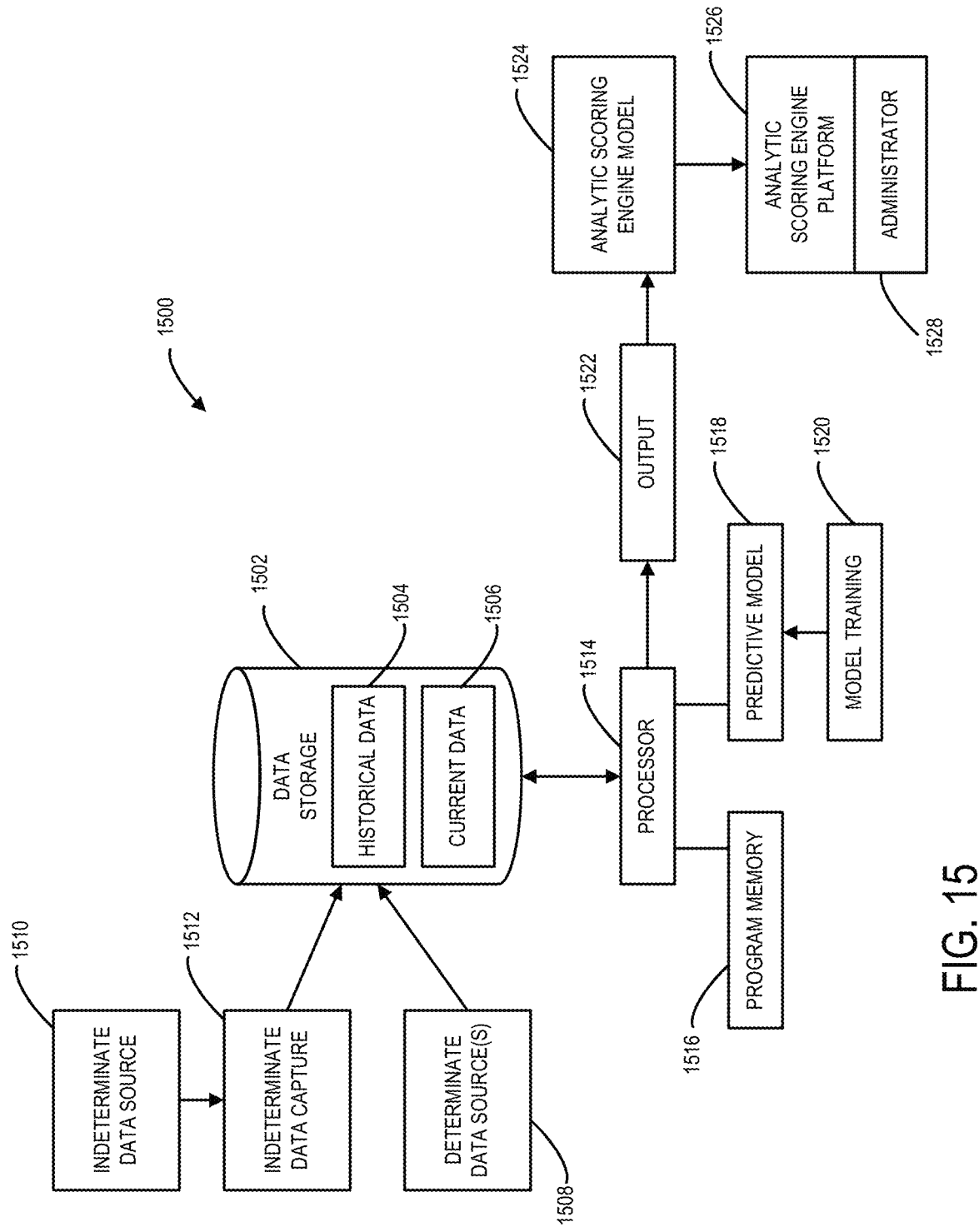
FIG. 15 illustrates a system having a predictive model in accordance with some embodiments.

According to some embodiments, one or more predictive models may be used to allocate resources. Features of some embodiments associated with a predictive model will now be described by first referring to FIG. 15. FIG. 15 is a partially functional block diagram that illustrates aspects of a computer system 1500 provided in accordance with some embodiments of the invention. For present purposes it will be assumed that the computer system 1500 is operated by an insurance company (not separately shown) for the purpose of supporting an allocation of resources (e.g., to assign return to work case managers to STD insurance claims, etc.).

The computer system 1500 includes a data storage module 1502. In terms of its hardware the data storage module 1502 may be conventional, and may be composed, for example, by one or more magnetic hard disk drives. A function performed by the data storage module 1502 in the computer system 1500 is to receive, store and provide access to both historical transaction data (reference numeral 1504) and current transaction data (reference numeral 1506). As described in more detail below, the historical transaction data 1504 is employed to train a predictive model to provide an output that indicates an identified performance metric and/or an algorithm to score results, and the current transaction data 1506 is thereafter analyzed by the predictive model. Moreover, as time goes by, and results become known from processing current transactions (e.g., claim resolution results), at least some of the current transactions may be used to perform further training of the predictive model. Consequently, the predictive model may thereby appropriately adapt itself to changing conditions.

Either the historical transaction data 1504 or the current transaction data 1506 might include, according to some embodiments, determinate and indeterminate data. As used herein and in the appended claims, "determinate data" refers to verifiable facts such as the an age of a business; an automobile type; a policy date or other date; a driver age; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 1508 that are included in the computer system 1500 and are coupled to the data storage module 1502. The determinate data may include "hard" data like a claimant's name, date of birth, social security number, policy number, address, an underwriter decision, etc. One possible source of the determinate data may be the insurance company's policy database (not separately indicated).

The indeterminate data may originate from one or more indeterminate data sources 1510, and may be extracted from raw files or the like by one or more indeterminate data capture modules 1512. Both the indeterminate data source(s) 1510 and the indeterminate data capture module(s) 1512 may be included in the computer system 1500 and coupled directly or indirectly to the data storage module 1502. Examples of the indeterminate data source(s) 1510 may include data storage facilities for document images, for text files, and digitized recorded voice files. Examples of the indeterminate data capture module(s) 1512 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual or claim.

The computer system 1500 also may include a computer processor 1514. The computer processor 1514 may include one or more conventional microprocessors and may operate to execute programmed instructions to provide functionality as described herein. Among other functions, the computer processor 1514 may store and retrieve historical insurance transaction data 1504 and current transaction data 1506 in and from the data storage module 1502. Thus the computer processor 1514 may be coupled to the data storage module 1502.

The computer system 1500 may further include a program memory 1516 that is coupled to the computer processor 1514. The program memory 1516 may include one or more fixed storage devices, such as one or more hard disk drives, and one or more volatile storage devices, such as RAM devices. The program memory 1516 may be at least partially integrated with the data storage module 1502. The program memory 1516 may store one or more application programs, an operating system, device drivers, etc., all of which may contain program instruction steps for execution by the computer processor 1514.

The computer system 1500 further includes a predictive model component 1518. In certain practical embodiments of the computer system 1500, the predictive model component 1518 may effectively be implemented via the computer processor 1514, one or more application programs stored in the program memory 1516, and computer stored as a result of training operations based on the historical transaction data 1504 (and possibly also data received from a third party). In some embodiments, data arising from model training may be stored in the data storage module 1502, or in a separate computer store (not separately shown). A function of the predictive model component 1518 may be to determine appropriate resource allocations for a set of STD insurance claims. The predictive model component may be directly or indirectly coupled to the data storage module 1502.

The predictive model component 1518 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1500 includes a model training component 1520. The model training component 1520 may be coupled to the computer processor 1514 (directly or indirectly) and may have the function of training the predictive model component 1518 based on the historical transaction data 1504 and/or information about insurance claims. (As will be understood from previous discussion, the model training component 1520 may further train the predictive model component 1518 as further relevant data becomes available.) The model training component 1520 may be embodied at least in part by the computer processor 1514 and one or more application programs stored in the program memory 1516. Thus, the training of the predictive model component 1518 by the model training component 1520 may occur in accordance with program instructions stored in the program memory 1516 and executed by the computer processor 1514.

In addition, the computer system 1500 may include an output device 1522. The output device 1522 may be coupled to the computer processor 1514. A function of the output device 1522 may be to provide an output that is indicative of (as determined by the trained predictive model component 1518) particular results, insurance claim resolutions, etc. The output may be generated by the computer processor 1514 in accordance with program instructions stored in the program memory 1516 and executed by the computer processor 1514. More specifically, the output may be generated by the computer processor 1514 in response to applying the data for the current simulation to the trained predictive model component 1518. The output may, for example, be a numerical estimate and/or likelihood within a predetermined range of numbers. In some embodiments, the output device may be implemented by a suitable program or program module executed by the computer processor 1514 in response to operation of the predictive model component 1518.

Still further, the computer system 1500 may include an analytic scoring engine model 1524. The analytic scoring engine model 1524 may be implemented in some embodiments by a software module executed by the computer processor 1514. The analytic scoring engine model 1524 may have the function of facilitating resource allocations for STD insurance claims via a portion of the display on the output device 1522. Thus, the analytic scoring engine model 1524 may be coupled, at least functionally, to the output device 1522. In some embodiments, for example, the analytic scoring engine model 1524 may report results and/or predictions by routing, to an administrator 1528 via an analytic scoring engine platform 1526, a results log and/or automatically generated filter criteria generated by the predictive model component 1518. In some embodiments, this information may be provided to an administrator 1528 who may also be tasked with determining whether or not the results may be improved (e.g., by further adjusting the models).

Thus, embodiments may provide an automated and efficient way to address the need for a consistent and objective determination of how to deploy scarce resources in connection with a group benefits employee insurance plan. Embodiments may also provide a clinical analytics scoring engine tool as a web-based data application that allows group benefits clinicians to quickly analyze subsets of STD claims to determine which groups of claims warrant proactive intervention by medical case managers, behavioral health case managers, and return to work coordinators. Note that insurance enterprise might need to process hundreds of thousands of STD insurance claims annually. Each claim may be managed by an ability analyst who is responsible for reviewing and adjudicating the claim. In addition to ability analysts, an insurance enterprise may employ clinicians to provide medical, behavioral, and/or vocational expertise for the claims.

Historically, this group of clinicians has played a reactive role, intervening on claims at the request of the ability analyst. According to some embodiments described herein, the clinical group may take on a more proactive role, using expertise to identify which claims might potentially benefit from a medical, behavioral, and/or vocational clinician. An insurance enterprise might have an extensive store of historical claim data, including clinical intervention rates and outcomes. The clinical analytics scoring engine tool is designed to help an insurance enterprise improve group benefits STD claim outcomes by bridging the gap between data analytics and clinical expertise. It may provide a user-friendly web-based interface to allow a clinician to generate hypotheses around proactive intervention and get a statistical profile around a given set of claim criteria.

According to some embodiments, the tool accept inputs in the form of variables that impact claim outcomes such as: diagnosis category and code, age at date of disability, surgical procedure code, job class, and claim complexity (claim segment). Additional variables may be generated and added to the data set as needed and could be determined via text mining of claim files. The may tool generate a number of key outputs based on the selected input variables, such as: clinical intervention rate, medical case manager, behavioral health case manager, return to work coordinator, clinical resolution/success rate (based on defined clinical resolutions), clinical impactability, total claims per year, median and mean claim duration days, LTD risk, volatility, and/or likelihood to exceed duration by 14 days or more.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 16:
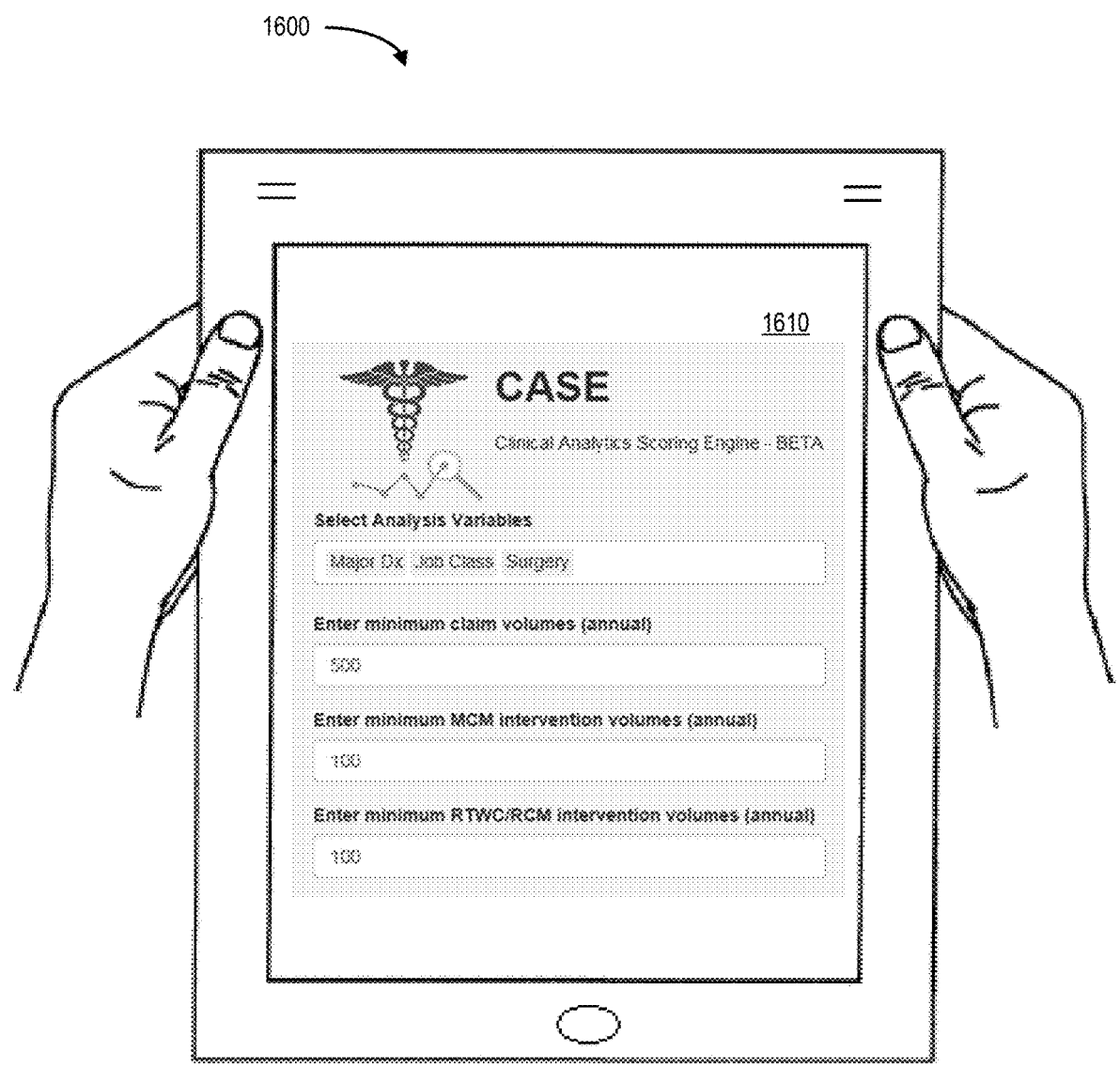
FIG. 16 illustrates a tablet computer displaying a resource allocation user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Similarly, the displays and devices illustrated herein are only provided as examples, and embodiments may be associated with any other types of user interfaces. For example, FIG. 16 illustrates a handheld tablet computer 1600 displaying a resource allocation display 1610 according to some embodiments. The resource allocation display 1610 might include user-selectable graphical data providing information about search criteria and/or results that can be selected and/or modified by a user of the handheld computer 1600.

Figure 17:
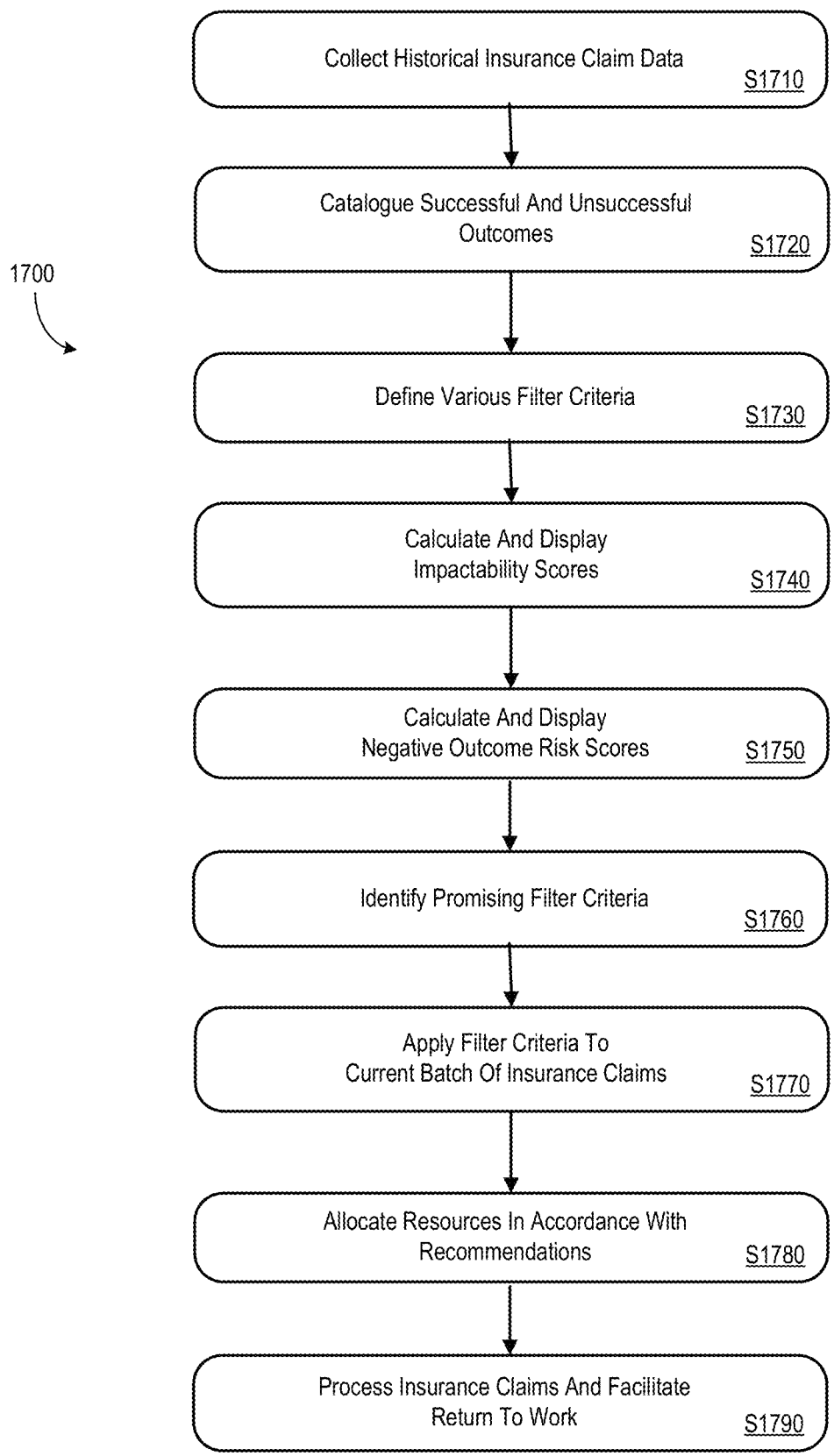
FIG. 17 illustrates an overall enterprise workflow in accordance with some embodiments.

Embodiments described herein may help an insurance enterprise allocate scarce resource in an efficient and effective manner. For example, FIG. 17 illustrates an overall enterprise workflow 1700 in accordance with some embodiments. At S1710, the insurance enterprise may collect historical STD insurance claim data. The historical data might be collected, for example, as STD insurance claims are processed, closed, transitioned to LTD claims, etc. At S1720, the system may catalogue "successful" and "unsuccessful" outcomes. For example, an outcome tracker system might analyze processed STD insurance claims and determine which one meet a clinical definition for "success" for the type of injury involved, age of claimant, etc.

At S1730, various filter criteria may be defined. For example, an operator (or group of operators) might wonder if a particular subset of insurance claims might especially benefit from being assigned to a return to work coordinator. At S1740, the system may automatically calculate and display impactability scores for the defined filter criteria. The impactability score might indicate how likely it is that a particular type of claim will benefit from an allocation or resources. Similarly, at S1750 the system may automatically calculate and display negative outcome risk scores for the defined filter criteria. The negative outcome risk scores might indicate how beneficial a positive influence would be to the insurance enterprise (e.g., by avoiding a LTD transition). At S1760, promising filter criteria may be identified. That is one or more subsets of historical claims might be identified as having relatively high impactability scores and relatively high negative outcome risk scores.

At S1770, the identified filter criteria may then be applied to a current batch of insurance claims. At S1780, resources may be allocated in accordance with the recommendations. For example, a return to work coordinator might be assigned to all of the claims identified at S1770. At S1790, the insurance claims may be processed and an employee's return to work may be facilitated. In this way, the scarce resources (e.g., the return to work coordinator's time) may be allocated to STD insurance claims in an effective and efficient manner.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate an allocation of resources for an enterprise system via an automated back-end application computer server, comprising:
   (a) a historical request data store containing electronic records representing a plurality of historical requests and, for each historical request, a set of analysis variables including:
      a request description,
      resource allocation data, and
      at least one outcome indication;
   (b) an automated outcome tracker system computer programmed to:
      (i) retrieve the electronic records from the historical request data store,
      (ii) catalogue a subset of the electronic records, based on the at least one outcome indication for each electronic record, as representing positive outcomes, and
      (iii) output information about the catalogued subset of electronic records;
   (c) the automated back-end application computer server, coupled to the automated outcome tracker system computer, programmed to:
      (iv) receive, through a distributed communication network, a set of analysis filter criteria comprising indications of a plurality of analysis variables entered via an interactive graphical user interface display,
      (v) access the electronic records from the historical request data store and receive the information about the catalogued subset of electronic records from the automated outcome tracker system computer,
      (vi) based on the analysis filter, resource allocation analysis variables, and catalogued subset of electronic records, calculate impactability scores, and
      (vii) transmit indications of the impactability scores to be provided via the interactive graphical user interface display; and
   (d) a communication port coupled to the back-end application computer server to facilitate an exchange of electronic messages associated with the interactive graphical user interface display via the distributed communication network.

2. The system of claim 1, wherein the automated back-end computer server is further programmed to:
   (viii) based on the analysis filter, resource allocation analysis variables, and outcome indications, calculate negative outcome risk scores, wherein indications of the negative outcome risk scores are also transmitted to be provided via the interactive graphical user interface display.

3. The system of claim 2, further comprising:
   (e) a risk allocation tool computer, programmed to:
      receive the set of analysis filter criteria as meeting a pre-determined performance threshold,
      receive electronic records representing a plurality of current requests and, for each historical request, a set of analysis variables, and
      automatically output a resource allocation recommendation for the enterprise system in connection with each current request based on the set of analysis filter criteria.

4. The system of claim 2, wherein the enterprise system is associated with a group benefits insurance system and the historical requests represent short term disability insurance claims.

5. The system of claim 4, wherein the request description is associated with at least one of a diagnosis category, a diagnosis code, and a surgical procedure code and further wherein the resource allocation data is associated with at least one of a medical case manager, a behavioral health case manager, and a return to work coordinator.

6. The system of claim 4, wherein at least one outcome indication is associated with a disability duration and the catalogued subset represents positive outcomes are associated with a defined clinical resolution.

7. The system of claim 4, wherein the set of analysis variables includes an injury description and further includes claimant data comprising at least one of: an age at date of disability, a job class, a gender, and demographic information about the claimant.

8. The system of claim 4, wherein the set of analysis variables includes an injury description and further includes employment data comprising at least one of: an inability to contact claimant, an indication claimant has employment issues, a prior history of claims, a hiring date, and a retirement date.

9. The system of claim 4, wherein the set of analysis variables includes an injury description and further includes at least one of: a claim volume, a claim complexity segment, a detailed description of a primary disabling diagnosis, a medical diagnosis code, an indication of whether a diagnosis is highly subjective, an indication of multiple diagnoses, a surgery code, an indication of a musculoskeletal diagnosis, an indication of a diabetes diagnosis, a substance abuse diagnosis, a hypertension diagnosis, and a lower limb fracture diagnosis.

10. The system of claim 4, wherein the impactability scores are associated with at least one of: medical case managers, behavioral health case managers, and return to work coordinators.

11. The system of claim 3, wherein the negative outcome risk scores are associated with relative risks of transitions from short term disability insurance claims to long term disability insurance claims.

12. The system of claim 3, wherein the automated back-end application computer server is further programmed to:
   receive, through the distributed communication network, an adjusted set of analysis filter criteria,
   re-calculate the impactability scores based on the adjusted set of analysis filter criteria,
   re-calculate the negative outcome risk scores based on the adjusted set of analysis filter criteria, and
   transmit indications of the re-calculated impactability and negative outcome risk scores to be provided via the interactive graphical user interface display.

13. The system of claim 3, wherein the set of analysis filter criteria further includes at least one search term.

14. The system of claim 3, wherein the automated back-end application computer server is further programmed to calculate clinical intervention rates and total claim volumes.

15. The system of claim 3, wherein the automated back-end application computer server is further programmed to calculate volatility scores associated with relative variability in claim durations for a specified group of claims as compared to an overall population of claims.

16. The system of claim 3, wherein the automated back-end application computer server is further programmed to calculate at least one of: a median claim duration, a mean claim duration, a total number of interventions, interventions as a percent of claim volume, successes as a percentage of interventions, a mean number of paid benefit days, a median number of paid benefit days, and a standard deviation of claim duration days.

17. A computerized method to facilitate an allocation of resources for an enterprise system via an automated back-end application computer server, comprising:

retrieving, by an automated outcome tracker system computer from a historical request data store, electronic records representing a plurality of historical requests and, for each historical request, a set of analysis variables including: a request description, resource allocation data, and at least one outcome indication;

cataloguing, by the automated outcome tracker system computer, a subset of the electronic records, based on the at least one outcome indication for each electronic record, as representing positive outcomes;

outputting, from the automated outcome tracker system computer, information about the catalogued subset of electronic records;

receiving, by the automated back-end application computer server through a distributed communication network, a set of analysis filter criteria comprising indications of a plurality of analysis variables entered via the interactive graphical user interface display;

accessing, by the back-end application computer server, the electronic records from the historical request data store and receiving the information about the catalogued subset of electronic records from the automated outcome tracker system computer;

based on the analysis filter, resource allocation analysis variables, and catalogued subset of electronic records, calculating impactability scores;

based on the analysis filter, resource allocation analysis variables, and outcome indications, calculating negative outcome risk scores; and transmitting, from the back-end application computer server, indications of the impactability scores and negative outcome risk scores to be provided via the interactive graphical user interface display.

18. The method of claim 17, wherein the enterprise system is associated with a group benefits insurance system, the historical requests represent short term disability insurance claims, the request description is associated with a diagnosis category, the resource allocation data is associated with a medical case manager, at least one outcome indication is associated with a disability duration, the catalogued subset representing positive outcomes are associated with a defined clinical resolution, and the negative outcome risk scores are associated with relative risks of transitions from short term disability insurance claims to long term disability insurance claims.

19. A system to facilitate an allocation of resources for an enterprise system via an automated back-end application computer server, comprising:

(a) a historical request data store containing electronic records representing a plurality of historical requests and, for each historical request, a set of analysis variables including:
a request description,
resource allocation data, and
at least one outcome indication;

(b) an automated outcome tracker system computer programmed to:
(i) retrieve the electronic records from the historical request data store,
(ii) catalogue a subset of the electronic records, based on the at least one outcome indication for each electronic record, as representing positive outcomes, and
(iii) output information about the catalogued subset of electronic records;

(b) the automated back-end application computer server, coupled to the automated outcome tracker system computer, programmed to:
(iv) receive, through a distributed communication network, a set of analysis filter criteria comprising indications of a plurality of analysis variables entered via the interactive graphical user interface display,
(v) access the electronic records from the historical request data store and receive the information about the catalogued subset of electronic records from the automated outcome tracker system computer,
(vi) based on the analysis filter, resource allocation analysis variables, and catalogued subset of electronic records, calculate impactability scores,
(vii) based on the analysis filter, resource allocation analysis variables, and outcome indications, calculate negative outcome risk scores, and
(viii) transmit indications of the impactability scores and negative outcome risk scores to be provided via the interactive graphical user interface display; and (c) a communication port coupled to the back-end application computer server to facilitate an exchange of electronic messages associated with the interactive graphical user interface display via the distributed communication network, wherein the graphical user interface display includes:
visually perceptible elements indicating the analysis filer,
information associated with the impactability scores proximate to the visually perceptible elements indicating the analysis filter, and
information associated with the negative outcome risk scores proximate to the visually perceptible elements indicating the analysis filter.

20. The system of claim 19, wherein the enterprise system is associated with a group benefits insurance system, the historical requests represent short term disability insurance claims, the request description is associated with a diagnosis category, the resource allocation data is associated with a medical case manager, at least one outcome indication is associated with a disability duration, the catalogued subset representing positive outcomes are associated with a defined clinical resolution, and the negative outcome risk scores are associated with relative risks of transitions from short term disability insurance claims to long term disability insurance claims.

* * * * *